(12) United States Patent
Haley et al.

(10) Patent No.: US 8,672,560 B2
(45) Date of Patent: Mar. 18, 2014

(54) HERMAPHRODITIC OPTICAL FIBER FERRULE

(75) Inventors: Edmund J. Haley, Dillsburg, PA (US); David Robert Baechtle, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 425 days.

(21) Appl. No.: 12/855,261

(22) Filed: Aug. 12, 2010

(65) Prior Publication Data

US 2012/0033921 A1    Feb. 9, 2012

Related U.S. Application Data

(60) Provisional application No. 61/371,440, filed on Aug. 6, 2010.

(51) Int. Cl.
  *G02B 6/38*    (2006.01)
  *G02B 6/36*    (2006.01)
(52) U.S. Cl.
  USPC ............................................. 385/78; 385/60
(58) Field of Classification Search
  None
  See application file for complete search history.

(56) References Cited

U.S. PATENT DOCUMENTS

| | | | |
|---|---|---|---|
| 6,210,047 B1 * | 4/2001 | Grois et al. ..................... | 385/83 |
| 6,305,849 B1 * | 10/2001 | Roehrs et al. ................... | 385/59 |
| 6,394,662 B1 * | 5/2002 | Foster ............................. | 385/60 |
| 6,874,945 B2 * | 4/2005 | Gherardini ..................... | 385/59 |
| 7,503,703 B1 * | 3/2009 | Thorson ......................... | 385/71 |
| 2001/0007603 A1 * | 7/2001 | Sakurai et al. ................. | 385/60 |
| 2003/0044125 A1 * | 3/2003 | Kiani et al. .................... | 385/78 |
| 2004/0052472 A1 * | 3/2004 | Roth et al. ...................... | 385/56 |
| 2004/0062490 A1 * | 4/2004 | Gimbel et al. ................. | 385/78 |
| 2005/0036742 A1 * | 2/2005 | Dean et al. ..................... | 385/71 |
| 2010/0215319 A1 * | 8/2010 | Childers et al. ................ | 385/60 |

* cited by examiner

*Primary Examiner* — Tina Wong

(57) ABSTRACT

The invention pertains to an optical coupling method and apparatus in which the connectors are hermaphroditic and each connector comprises a ferrule that provides (1) the coarse alignment of the fibers, (2) the fine alignment of the fibers, and (3) the releasable latching of two such ferrules to each other. Hence, two such ferrules can be used to connect optical fibers without the need for connector housings. The ferrule of this system includes an alignment protrusion and a complementary alignment hole on the front face of the ferrule for providing the fine alignment. Coarse alignment is provided by longitudinally-directed protrusions extending forwardly of the front face, and recesses in the ferrule that are complementary to the protrusion such that two such ferrules can be mated to each other with the protrusions of one such ferrule fitting snugly within the recesses of the other such ferrule. A releasable latching mechanism is provided on one or more of the protrusions and its complementary recess, such as a bump on one of the protrusion and recess and a mating divot on the other.

5 Claims, 4 Drawing Sheets

HERMAPHRODITIC OPTICAL FIBER FERRULE

CROSS-REFERENCE TO RELATED APPLICATIONS

This application claims the benefit of U.S. Provisional Patent Application No. 61/371,440, filed Aug. 6, 2010, the entire disclosure of which is hereby incorporated herein by reference.

FIELD OF TECHNOLOGY

The invention pertains to optoelectronics. More particularly, the invention pertains to a method and apparatus for coupling light between fibers at mating optical connectors.

BACKGROUND

It is typically the case that an optical signal transported over an optical fiber must be coupled between that optical fiber and another optical fiber or an optoelectronic device. Typically, the end of the optical fiber is outfitted with an optical connector of a given form factor, which connector can be coupled to a mating optical connector of the same form factor that is outfitted on the other fiber (or optoelectronic device).

Optical cables that are connected to each other through a pair of mating connectors may comprise a single optical fiber. However, more and more commonly, optical cables contain a plurality of optical fibers (sometimes more than 1,000 fibers) and the light in each optical fiber in the cable is coupled through a pair of mating connectors to a corresponding optical fiber in another cable.

Optical connectors generally must be fabricated extremely precisely to ensure that as much light as possible is transmitted through the mating connectors so as to minimize signal loss during transmission. In a typical optical fiber, the light is generally contained only within the core of the fiber, which typically may be about 10 microns in diameter for a single-mode fiber or about 50 microns in diameter for a multi-mode fiber. Accordingly, lateral alignment of the fibers in one connector with the fibers in the other connector must be very precise.

Many different connectors are available on the market today, each having a unique form factor. Well known standard optical connectors available today include MT, MPO, SC, FC, ST, LC, and SMC connectors.

Commonly, an optical connector comprises a ferrule (within which the fibers are laid out with their end faces coplanar) enclosed within a connector housing. The connector housing usually provides coarse alignment of the ferrules with each other as well as a releasable latching mechanism for holding two such mated connectors together. The ferrules provide the fine alignment of the fibers, often within tolerances as small as 1-2 microns or less.

In some connectors, there are two forms of the connector, e.g., male and female, and one such form can be mated only to the other such form. In other connectors, known as hermaphroditic connectors, there is only one connector form such that two identical connectors can be mated together.

SUMMARY

The invention pertains to an optical coupling method and apparatus in which the connectors are hermaphroditic and each connector comprises a ferrule that provides (1) the coarse alignment of the fibers, (2) the fine alignment of the fibers, and (3) the releasable latching of two such ferrules to each other. Hence, two such ferrules can be used to connect optical fibers without the need for connector housings. The ferrule of this system includes an alignment protrusion and a complementary alignment hole on the front face of the ferrule for providing the fine alignment. Coarse alignment is provided by longitudinally-directed protrusions extending forwardly of the front face, and recesses in the ferrule that are complementary to the protrusion such that two such ferrules can be mated to each other with the protrusions of one such ferrule fitting snugly within the recesses of the other such ferrule. A releasable latching mechanism is provided on one or more of the protrusions and its complementary recess, such as a bump on one of the protrusion and recess and a mating divot on the other.

DETAILED DESCRIPTION OF EMBODIMENTS

The principles of the present invention can be applied to virtually any type of optical connection, including single fiber connections, multiple fiber connections, lensed connections, contacting-fiber connections (where the end faces of the mating fibers in the two connectors contact each other), lensed connections (where there is a lens or other optical element—usually one lens in each connector—between the mating fibers), single mode fiber connections, multi-mode fiber connections, etc. In the embodiments illustrated and discussed herein, the invention is embodied in a multiple-fiber, single-mode, lensed connector. However, this is merely exemplary.

Figure 1:
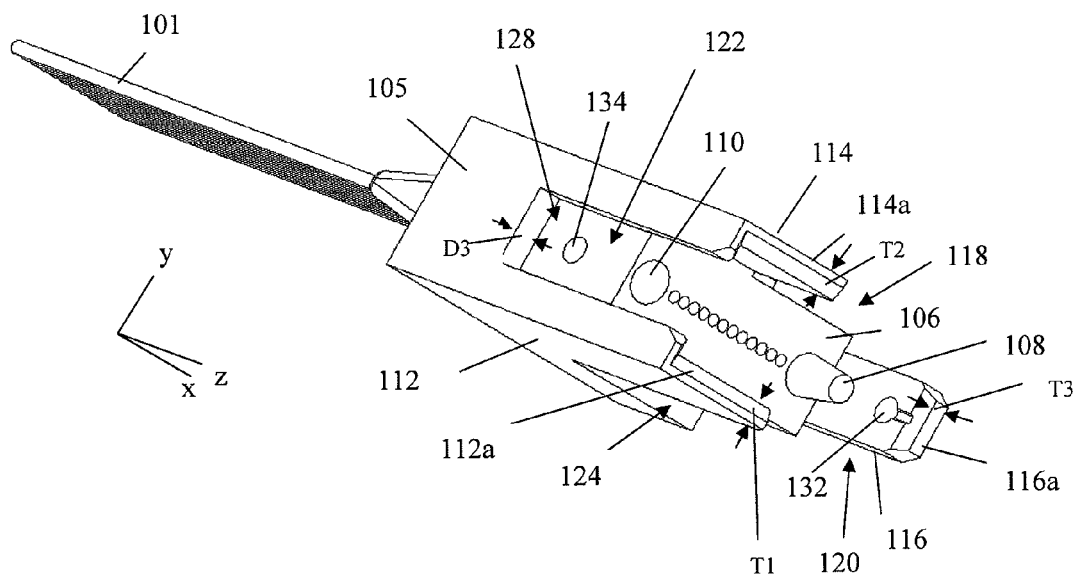
FIG. 1 is a semi-transparent perspective view from a first perspective of a connector in accordance with a first embodiment of the invention.
Figure 2:
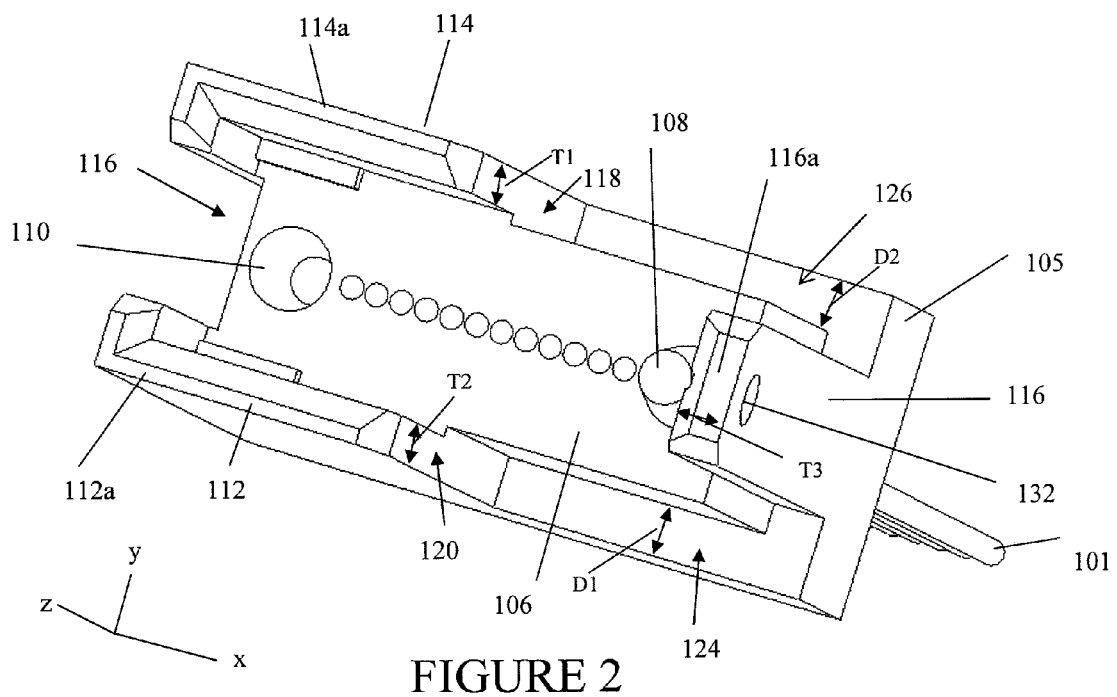
FIG. 2 is a perspective view from a second perspective of the connector of FIG. 1.
Figure 3:
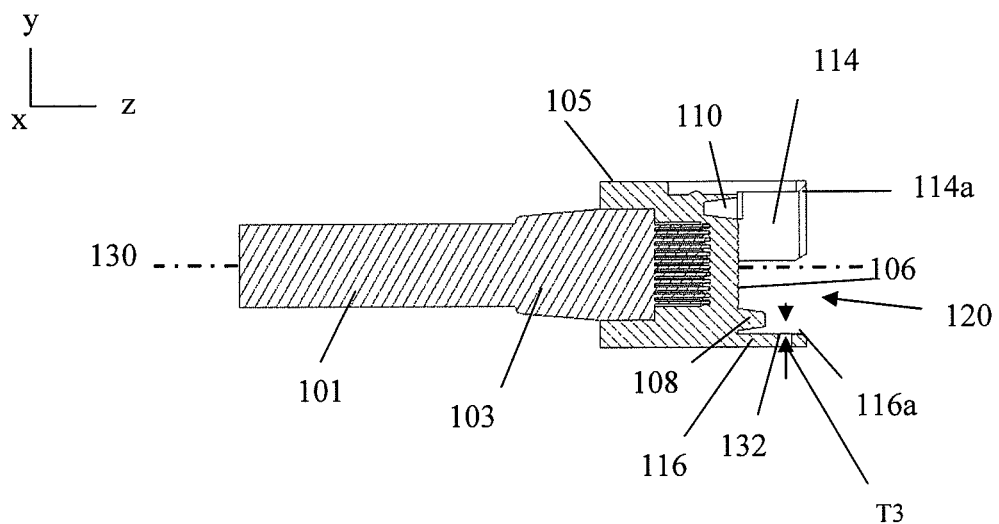
FIG. 3 is a cross-sectional view of the connector of FIG. 1 taken through section 3-3 in FIG. 1.

FIGS. 1 and 2 are perspective views of an optical connector in accordance with one embodiment of the invention from two different vantage points. FIG. 3 is a cross-sectional view through section 3-3 in FIG. 1. An optical cable 101 is terminated in a ferrule 105. In this example, a strain relief boot 103 is provided at the mating of the cable 101 to the ferrule 105. The cable 101 comprises multiple fibers, in this example, 12 coplanar fibers laid out in a ribbon [the end faces of which are recessed within the ferrule from the front surface 106.]

The ferrule includes a fine alignment mechanism in the front face 106 designed to mate with an identical fine alignment mechanism on another ferrule to provide the fine alignment of the fibers in the two ferrules in the lateral dimensions (x and y in the Figures). It also establishes both the rotational alignment of two mated about their longitudinal axes and the angular alignment of the longitudinal axes of the two ferrules. In this example, the alignment mechanism comprises a pin 108 and a bore 110 positioned on opposite sides of the 12 fibers. The alignment mechanism need not necessarily be disposed in the front face. For instance, it can extend forward of the front face from the side of the ferrule. When two connectors are mated, the pin 108 of each of them will fit within the bore 110 of the other in order to provide the fine alignment of the fibers laterally relative to each other. It also assures that the two connectors can be mated in only one rotational orientation relative to each other. The pin 108 and bore 110 may be longitudinally tapered so that the pin 108 can initially enter the bore 110 while the two ferrules are not in perfect lateral alignment. However, as the pins are further advanced into the bores 110, the tapered circumferential wall of the pin 108 and the tapered inner surface of the bore 110 contact each other and increasingly more accurately align the two ferrules. The pin and hole arrangement 108, 110 is a hermaphroditic arrangement because two identical ferrules 105 can be mated to each other.

In order to provide coarse alignment of two ferrules prior to the engagement of the pins 108 and bores 110 so as to assist in the guidance of the pins 108 into the bores 110, longitudinal protrusions are provided extending forwardly of the front face 106 of the ferrule 105. In this embodiment, the protrusions are three walls 112, 114 and 116. The walls 112, 114 and 116 can be considered to define three longitudinally oriented spaces 118, 120 and 122 between them. Furthermore, the body of the ferrule 105 includes recesses 124, 126 and 128 longitudinally co-linear with the spaces 118, 120 and 122, respectively, and shaped complementarily to the protruding walls 112, 114, 116 so that the walls fit snugly within the recesses 124, 126, 128. In this example, the recesses 124, 126 and 128 have depths D1, D2, and D3 equal to the thickness T1, T2, T3 of the walls 112, 114, and 116, respectively. D1, D2 and D3 may be equal.

With reference to FIG. 3, when two such connectors 301, 302 are mated facing each other and rotated 180 degrees about their longitudinal axes, z, relative to each other, the forward-extending walls 112, 114 and 116 will fit within the recesses 124, 126 and 128 to coarsely longitudinally align the two connectors.

The walls 112, 114, 116 and complementary recesses 124, 126, 128 are longer in the longitudinal direction (z than the pin 108 and bore 110 so that the walls will become longitudinally coextensive with the recesses (i.e., the 124, 126, 128) before the pin 108 and bore 110 become longitudinally coextensive with each other. Thus, the mating of the walls 112, 114, 116 and recesses 124, 126, 128 provide the coarse alignment of the two connectors so that the pins 108 can enter the bores 110 to further provide the fine alignment.

Furthermore, wall 116 includes a hole, divot or other recess 132, whereas complementary recess 128 includes a complementary ball, bump, protrusion or other protuberance 134. The illustrated embodiment shows a semispherical bump 134 that mates with a semispherical recess. When wall 116 enters recess 128 to the desired depth, bump 134 will fit within divot 132 on the inside surface of wall 116 providing releasable latching of the two connectors to each other. More particularly, the wall 116 has some flexibility so that, it will flex outwardly when the front edge 116a of the wall meets bump 134 and then will snap back into its unstressed condition when wall 116 is advanced far enough for divot 132 to be longitudinally coextensive with the bump 134. Thus, the mating of divot 132 and bump 134 of the two connectors provides the releasable latching that will hold the two connectors together until pulled apart with sufficient force to overcome the inherent latching of the divot and bump 132, 134. The divot and bump should be positioned so that they engage when the front faces 106 of the two connectors are in planar contact with each other. The ball and socket described above is merely exemplary. Other geometries are possible, such as two flexible latches or two sloped wedges shaped or other contoured elements designed to provide a constant forward bias against each other tending to draw the two ferrules together. In fact, in the illustrated embodiment using the semispherical ball 134 and divot 132, if the divot and ball are positioned so that the ball 134 does not quite reach the exact center of the divot 132 when the front faces 106 of two connectors contact each other, then the rearward half of the ball 134 surface bearing against the forward half of the divot 132 surface will apply a constant force drawing the two connectors toward each other. A latching mechanism that applies a constant force drawing the two connectors together can eliminate the need for the supplemental spring that is common in optical connector designs to generate such forward biasing forces.

Furthermore, it may be desirable to make the walls 112, 114 and 116 slightly shorter in the longitudinal direction, Z, than the distance between the front face 106 of the ferrule and the rear edges 134, 136 and 138 of the recesses 124, 126 and 128, respectively, so as to assure that the front faces 106 of two mated connectors will not be prevented from contacting each other by the butting of the forward edges 112a, 114a, or 116a of walls 112, 114, 116 with the rear edges 124a, 126a, and 128a of the recesses.

This ferrule design allows a high quality optical connection of two ferrules without the need for a connector housing surrounding the ferrules or a separate spring to bias the two connectors toward each other. This makes the design simpler and less costly. The ferrule may be constructed unitarily, such as by molding or casting.

The ferrule 105 itself provides the coarse alignment, the fine alignment, and the releasable latching. This provides significant cost savings in the manufacturer of optical connectors insofar as it eliminates the need for a connector housing and assembly steps for assembling the ferrule within a connector housing.

Figure 4A:
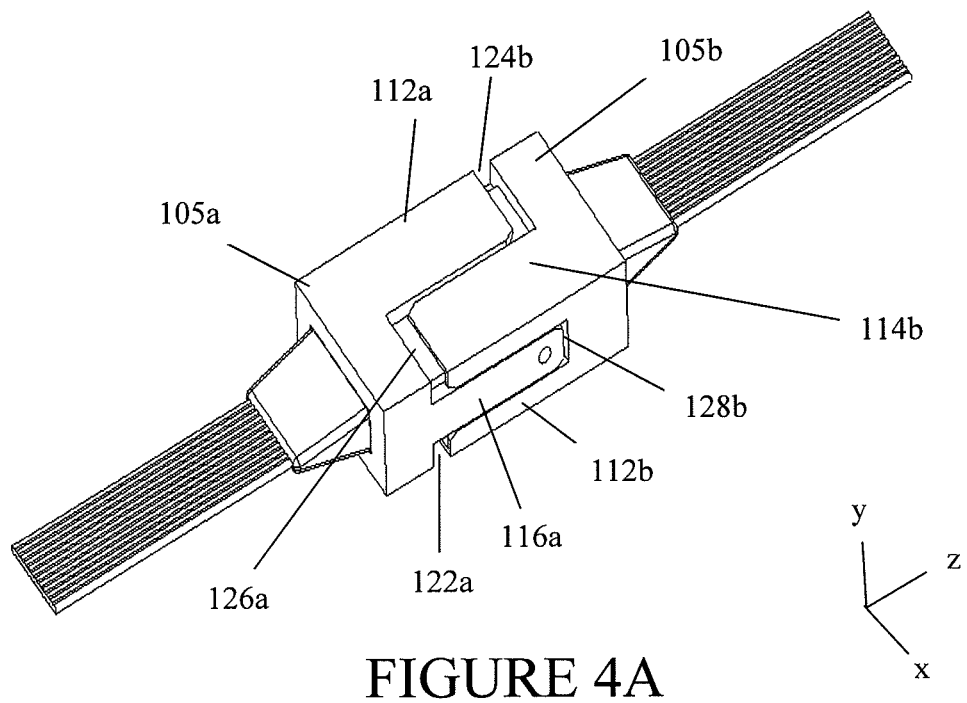
FIGS. 4A and 4B are perspective views from two different perspectives of two of the connectors of FIG. 1 mated together to form an optical coupling between two optical cables.
Figure 4B:
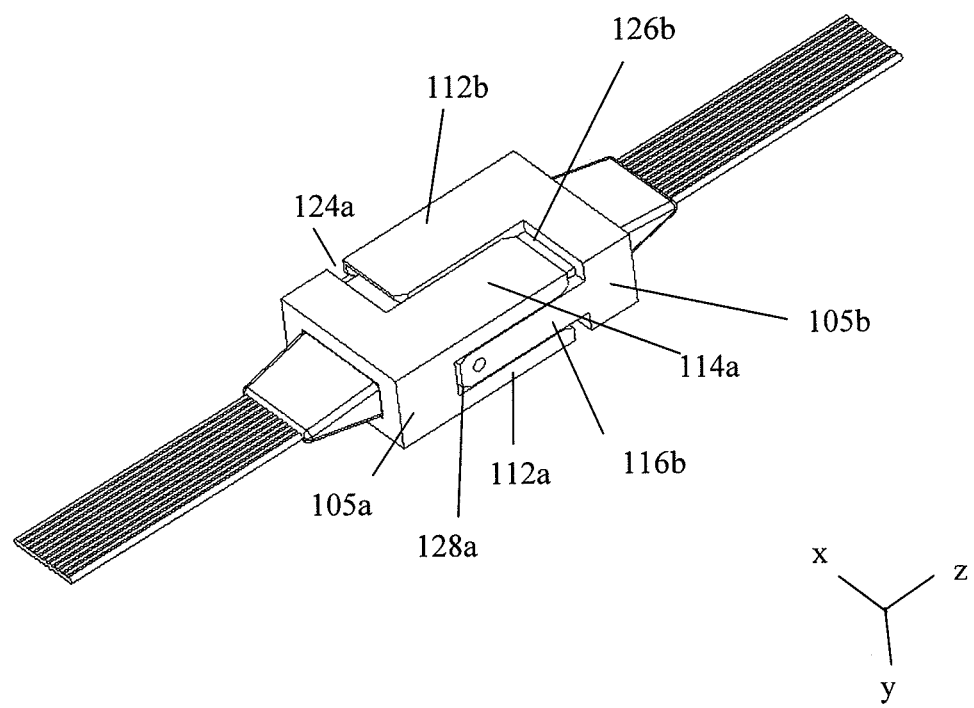

FIGS. 4A and 4B show two connectors 105a, 105b mated together in accordance with the invention from two different perspectives. As shown, the walls 112a, 114a, 116a of connector 105a fit within the respective recesses 124b, 126b, 128b of the other connector 105b and vice versa (walls 112b, 114b, 116b of connector 105b fit within recesses 124a, 126a, 128a of connector 105a). The bumps 134a, 134b of each connector 105a, 105b fit within the divots 132b, 132a, respectively, of the other connector 105b, 105a. Finally, the pins 108a, 108b fit within the holes 110b, 110a, respectively.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An optical ferrule for coupling to another optical ferrule so as to align an optical transport in the ferrule to an optical transport in a mated ferrule comprising:

a ferrule body for housing an optical transport therein oriented in a longitudinal direction, the ferrule body having front face substantially perpendicular to the longitudinal dimension and through which front face light emanating from an optical transport disposed in the ferrule body will pass and a side surface substantially parallel the longitudinal dimension;

a plurality of protrusions extending longitudinally forward of the front face and disposed circumferentially around the front face;

a plurality of recesses in the side surface of the ferrule extending rearwardly from the front face, the plurality of recesses being complementary in size, shape, and position to the plurality of protrusions so that when two such ferrules are laterally aligned with their front faces facing each other, the two ferrules can be advanced toward each other with the protrusions of each ferrule extending into the recesses of the other ferrule in only one rotational orientation relative to each other thereby providing a coarse lateral and rotational alignment of the two ferrules;

a pin extending longitudinally forward of the front face;

a hole in the front face, the hole being complementary in size, shape, and position to the pin so that when two such ferrules are laterally aligned with their front faces facing each other, the two ferrules can be advanced toward each other with the pin of each ferrule extending into the hole of the other ferrule in only one rotational orientation relative to each other thereby providing fine lateral and rotational alignment of the two ferrules, wherein the pin is shorter in the longitudinal dimension that the protrusion such that the at least one protrusion will become longitudinally coextensive with the at least one recess before the pin will become longitudinally coextensive with the hole; and one of a bump and a mating hole disposed in the at least one protrusion and the other of the bump and the mating hole disposed in the at least one recess.

2. The ferrule of claim 1 wherein the ferrule is a unitary piece.

3. The ferrule of claim 2 wherein the ferrule is a molded piece.

4. The ferrule of claim 1 wherein the at least one protrusion comprises a plurality of circumferential walls surrounding the front face and the recess comprises a plurality of recesses in the side surface of the ferrule.

5. The ferrule of claim 4 wherein the bump and hole are positioned relative to each other so that the bump on a first such connector and the hole on a second such connector will mate when the front faces of the first and second ferrules are longitudinally spaced from each other a predetermined distance.

* * * * *